United States Patent
Cooper

(10) Patent No.: US 10,239,439 B2
(45) Date of Patent: Mar. 26, 2019

(54) TENSION MONITORING AND SIGNALING SYSTEM

(71) Applicant: Pacific States Manufacturing, Inc., Buhl, ID (US)

(72) Inventor: Richard Paul Cooper, Bend, OR (US)

( * ) Notice: Subject to any disclaimer, the term of this patent is extended or adjusted under 35 U.S.C. 154(b) by 0 days.

(21) Appl. No.: 15/942,396

(22) Filed: Mar. 30, 2018

(65) Prior Publication Data

US 2018/0319312 A1    Nov. 8, 2018

Related U.S. Application Data

(60) Provisional application No. 62/501,035, filed on May 3, 2017.

(51) Int. Cl.
*B60P 7/08* (2006.01)
*B65H 59/38* (2006.01)
*B65H 59/40* (2006.01)
*G01L 5/10* (2006.01)

(52) U.S. Cl.
CPC .......... *B60P 7/0861* (2013.01); *B65H 59/384* (2013.01); *B65H 59/40* (2013.01); *G01L 5/10* (2013.01)

(58) Field of Classification Search
CPC ... B66D 1/46; B66D 1/48; B66D 1/50; B66D 3/24; B66D 3/26; B60P 7/0823; B60P 7/0861; F16G 11/12; F16G 11/14
See application file for complete search history.

(56) References Cited

U.S. PATENT DOCUMENTS

| | | | | |
|---|---|---|---|---|
| 5,533,711 A | * | 7/1996 | Pickrell | B65H 51/30 242/396.9 |
| 6,598,859 B1 | * | 7/2003 | Kureck | B66C 13/23 254/292 |
| 9,576,475 B2 | * | 2/2017 | Bardin | H04Q 9/00 |
| 9,610,883 B1 | * | 4/2017 | Mahaffey | F16G 11/12 |
| 9,776,550 B2 | * | 10/2017 | Mahaffey | F16M 7/00 |
| 2011/0000317 A1 | * | 1/2011 | Ruan | B60P 7/083 73/862.42 |
| 2011/0001627 A1 | * | 1/2011 | Ruan | B60P 7/0861 340/668 |
| 2014/0070152 A1 | * | 3/2014 | Bond | B25B 25/00 254/222 |
| 2017/0028901 A1 | * | 2/2017 | Rollins | H04W 4/70 |

* cited by examiner

*Primary Examiner* — Emmanuel M Marcelo

(57) ABSTRACT

An automatic tension sensing and control system for cargo restraints comprises a load binder, a tension sensor, an actuator coupled to the load binder, and a control module. The control module receives signals from the sensor and can command the actuator to tighten or slacken the load binder. The system can also include an annunciator and an information storage and retrieval system.

14 Claims, 2 Drawing Sheets

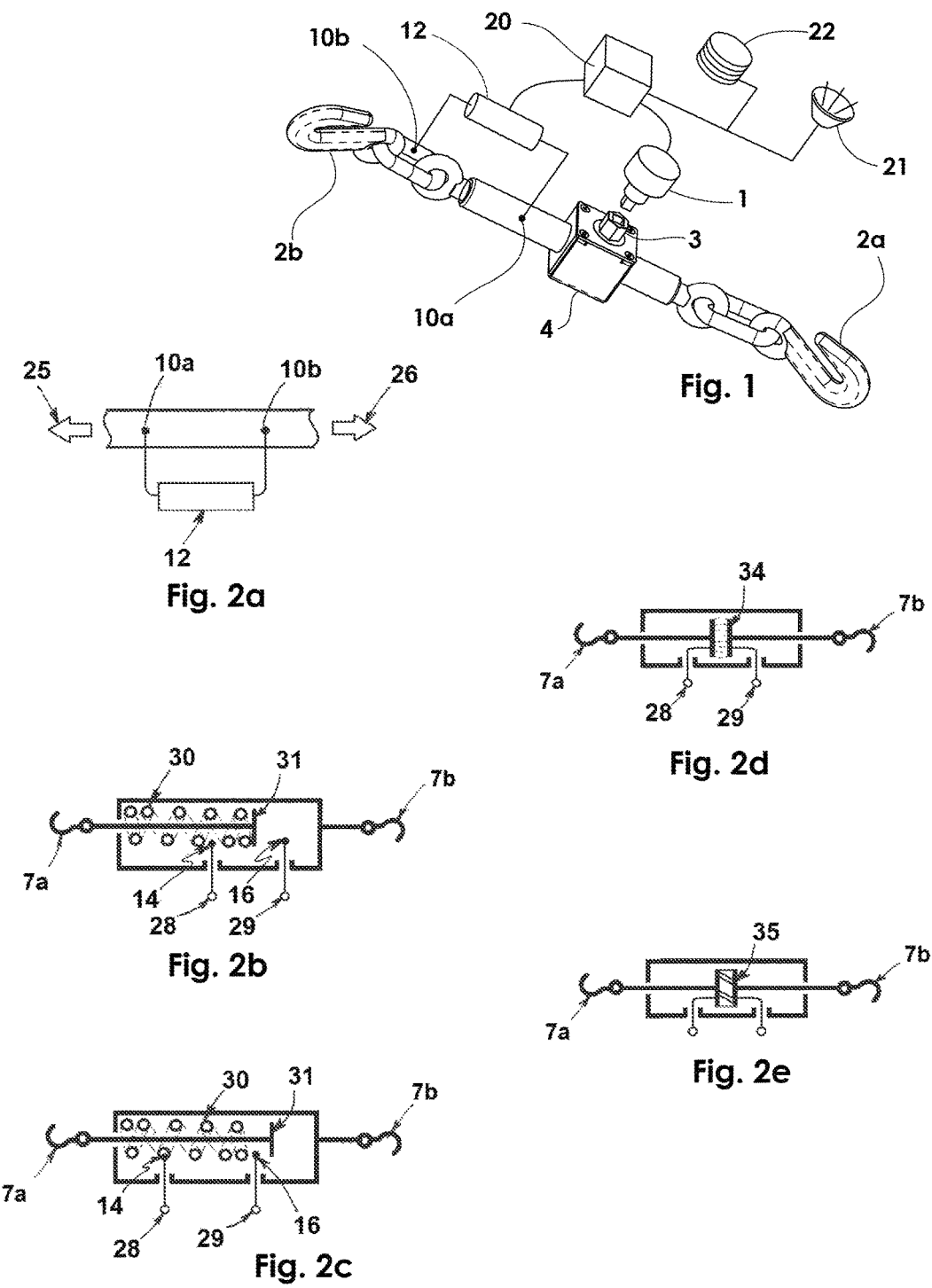

TENSION MONITORING AND SIGNALING SYSTEM

CROSS-REFERENCES TO RELATED APPLICATIONS

This application claims the benefit of and priority to U.S. provisional application 62/501,035 filed May 3, 2017. The entire contents of that provisional application is herein incorporated by reference.

This application incorporates by reference the entire contents of U.S. utility patent application Ser. No. 14/973,932 filed Dec. 18, 2015 which issued as U.S. Pat. No. 9,610,883 on Apr. 4, 2017.

This application also incorporates by reference the entire contents of U.S. utility patent application Ser. No. 15/477,107 filed Apr. 2, 2017, which issued as U.S. Pat. No. 9,776,550 on Oct. 3, 2017.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention relates to sensing and monitoring devices equipped to or fitted to tensioning devices used to secure cargo for transport or to otherwise prevent unwanted displacement of a load or mass of ponderous, bulky objects.

The invention senses and signals tension force residing in the tensioning device, and the signal can be a value expressed as a digital signal or an analogue signal.

BACKGROUND

With the development of autonomous (self-driving) vehicles including trucks, there will have to be a method to insure that cargo loads are maintained in a secure situation as conditions such as vibration, road roughness, or abrupt starts and stops result in loosening of cargo securement components such as chain, straps, cables and the like. These conditions can also apply to trucks and trains that have operators on board, or vessels at sea.

Closed loop control systems can govern a system so that it operates within specified and acceptable boundaries defining a predetermined state without requiring continuous oversight or adjustment by a system operator or other person. Closed loop control systems monitor one or more operating parameters, compare this or these against one or more desired set point values, compute a difference value, and then enact one or more changes in a system state or in one or more other parameters in response to the difference between the operating parameters and the set point values. One example in vehicles is a cruise control system, which compares a desired set point speed against a measured speed of a vehicle, and for a great enough disparity will alter the power developed by the vehicle engine so as to close a gap between the desired vehicle speed and its actual speed.

Truck drivers hauling loads secured by straps, chains, wire rope and the like use tensioning devices such as winches, load binders, and come-along winches to develop tension forces much greater than human musculature in order to restrain large, ponderous, or bulky objects. But because the cargo restraints often slacken over time and especially due to shock and vibration in transit, the driver must typically make periodic stops to check and re-adjust the tensioning devices on the cargo restraints.

Unwanted movement of loose cargo can unbalance a vehicle, or crush or damage other valuable goods in a shipping compartment. Unwanted or unexpected movement of loose cargo can adversely affect maneuverability and render a vehicle or a vessel uncontrollable, resulting in accidents or other losses, and hazards or casualties if cargo falls off a vehicle, especially in an accident.

BRIEF SUMMARY

With the oncoming development of autonomous (self driving) vehicles including trucks, there will have to be a device capable of insuring that restrained cargo loads remain reliably secured during transit conditions and events such as vibration, road roughness, and abrupt starts and stops. As a first object of the invention, a sensing system coupled to an adjustable tensioning device of a cargo restraint and especially capable of making a signal if the tension in the device were to slacken, or if the device or cargo restraint were to become disconnected or uncoupled, would reduce or eliminate the need for a driver or a vessel crewman to inspect cargo restraints and allow the crew or the driver to attend to other tasks and thereby operate more efficiently.

The benefits of the invention can apply to both autonomous vehicles and vehicles having one or more drivers, operators, or crew aboard. It is therefore another object of the invention to provide a tension-related signal from a load binder to a controller of an autonomous vehicle or to a responsible person or both. A responsible person may be a driver, pilot, crewman, or a manager in charge of a shipment or of monitoring its progress.

In cases where a vessel or vehicle in motion must decelerate to a stop, remain stopped during an inspection of cargo restraints, and then re-accelerate back to transit speed, another object of the invention is to reduce or eliminate the need and time lost during these in-transit or intermediate inspection.

Another corollary object of the invention is to save fuel expended to re-accelerate after a stop for inspection of cargo restraints. The energy spent and lost in resuming transit speed after a stop is related to the energy lost in braking or halting the vehicle for the stop. Reducing or eliminating the need for inspection stops will also reduce or eliminate these energy expenditures.

If records could be compiled of where, when, how often, and how much automated tensioning of cargo restraints occurs during a journey, especially when compared among vehicles following similar routes or carrying similar goods, then as a further object of the invention, comparative metrics of driver or crew performance could be developed over time, and as a yet further object of the invention, analysis of larger volumes of transit data may reveal straits, passages, routes, or passes, or regions where in-transit goods are subject to greater actuarial risk of loss due to local or regional hazards such as rough roads, steep grades, currents acting on marine vessels, storm patterns, or other diurnal or seasonal environmental effects.

A general example of a diurnal environmental effect is a katabatic wind which descends daily from high land forms at a somewhat predictable time of the afternoon. A more specific example is the mistral wind pattern in southern France. A well-known example of a seasonal environmental effect is seen in the designation "WNA" on the lowest Plimsoll line of a typical ocean-going hull; it stands for "Winter North Atlantic" and signifies that vessels passing through that region during that season must be most lightly loaded. Weather affects cargo capacity.

A yet further object of the invention is for an embodiment in which the tension sensor or a plurality of sensors is able to calculate strain by means of sensing both tension and elongation of a cargo restraint or component or a portion of one of these elements, so that if a predicted material behaviour includes rupture or failure, a warning or a report can be generated and emitted, and autonomous vehicle control systems or a vehicle crew or driver can take appropriate actions or countermeasures.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

FIG. 1 shows a load binder, a tension sensor, a controller, and other components of the invention.

FIG. 2a shows a general sensor attached to a material under load and strain.

FIG. 2b shows an embodiment of a mechanical displacement sensor which is electrically normally closed but is shown in an open-circuit, operating condition.

FIG. 2c shows an embodiment of a mechanical displacement sensor which is electrically normally open unless a predetermined extension or another predetermined compression is obtained.

FIG. 2d shows an embodiment of a sensor using a capacitive or static electric field.

FIG. 2e shows an embodiment of a sensor using a piezoelectric element.

DETAILED DESCRIPTION OF CERTAIN EMBODIMENTS

Figure 3:
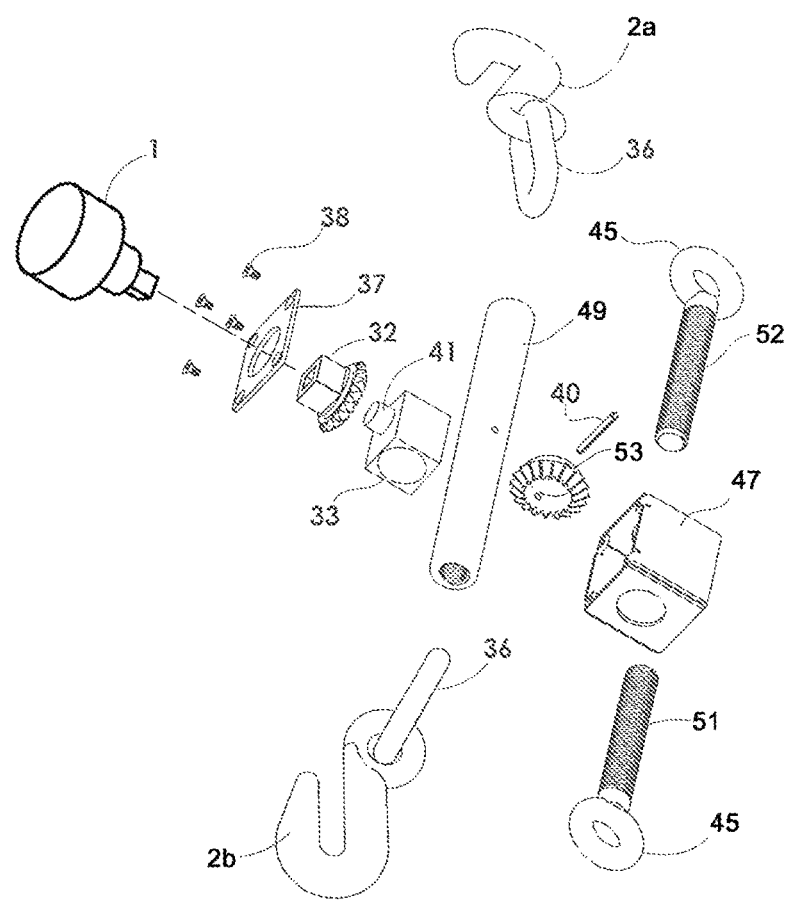
FIG. 3 shows a portion of another embodiment in accordance with the invention.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Also, mention of "operators," "drivers," or "crew" interchangeably means any person or persons tasked with the monitoring, control, or movement of vehicles or vessels or any cargo-carrying machinery. The verb "man" and its various forms such as the word "manned" indiscriminately include all genders, and are meant to describe one or more persons stationed where affordances such as physical controls, levers, steering wheels, pedals, and the like, or software equivalents to such physical controls are available for actuation to command and control motion, movement, or configuration of a vehicle, vessel, or cargo-carrying machinery. Similarly, the word "crewman" means any person of any gender assigned as staff or crew of a vessel or a vehicle, or otherwise responsible for operating or control of cargo-carrying machinery, or any assistant to operators, drivers, or pilots of vessels or vehicles.

This invention is a tension monitoring and control system. It uses a load binder and at least a first end effector and a second end effector and a tensioning means operatively connected to the load binder between the first and second effectors. The first and second ends of the load binder may also be referred to as distal and proximal ends, and first and second end effectors are affixed to the distal and proximal ends respectively. There is at least one sensor, most commonly for sensing a tensile load between two predetermined points, and an actuator such as a drive motor or a solenoid operatively coupled to the tensioning means. The tension sensor provides signals based on tensions sensed in the load binder to a control module operationally connected between the sensor and the actuator so that the control module can operate the tensioning means. Operating as a closed loop control system, the control module can monitor a signal it receives from a tension sensor, compare it to a reference value, and create a difference value, and then send a command to a tensioning device. More than one reference value may be stored in the control module to act as high and low set points which trigger countermeasures to restore the tension to within an acceptable range. Nested sets of high and low set points can be arranged so that countermeasures of increasing magnitude can be applied if a sensed value exceeds several set points.

As shown in FIG. 1, the system may utilize a tensioning device as described in U.S. Pat. No. 9,610,833 issued on Apr. 4, 2017 to Jay Lawrence Mahaffey, with an actuating device such as an electric or hydraulic motor or any other machine designed to develop rotary motion and torque upon receiving a command signal. The actuating device is connected to the input gear and actuated by a signal provided by a sensing device attached to the load restraint component such as a chain, cable or strap. The signal may be electrical, pneumatic, or mechanical, and may be analogue or digital.

A value of the signal can be proportional to or related to a tension force as sensed, or it can be responsive to a force value being met, exceeding, or falling beneath a threshold value or a predetermined value.

When the sensor senses a slackening from a predetermined tension of the restraining component, it sends a signal to the actuator causing the tensioning device to apply a force to bring the tension back to the prescribed and safe tension.

The sensing device further comprises a means to connect it to two different points on a component such as a chain, cable or strap to establish or store a reference distance. The two points can be on the same component or on separate but connected components that will withstand a tensile load passing through them. The distance between the two reference points is sensed continuously or intermit-tently thereafter, and any time a sensed distance varies beyond predetermined limits above or below the reference distance a signal is sent at least to the actuator. The signal may also be sent to an annunciator on a vehicle dashboard or control panel, and may also be sent to a data storage unit.

The connection means can be any means of mechanical attachment. Although the most typical embodiments employ fasteners, hooks, or clamps, other attachment means residing within the scope of the invention include clips, splices, clevises, knots, bends, ties, twist-ties, clasps, grips, buttons and slots, and adhesives. One or more tension sensors can also be permanently integrated within a load binder or a cargo restraint.

The actuator responds to the signal actuate the tensioning device and compensate for the change in sensed distance. For example, if the change in sensed distance was due to a slackening of the cargo restraint (chain, cable or strap, etc,) then the tensioning device will be driven by the actuator to tighten until the sensed distance is restored to reside within the predetermined limits.

Rather than a distance between two points, other sensing means can sense a tension in the tensioning device or in the cargo restraint, and compare in-service tension to a previously established reference tension and upper and lower operating limits. The control system will detect a sensed tension outside of the predetermined operating limits and send a signal to drive actuator, which will tension or slacken the tensioning device until the sensed tension is restored to reside within the predetermined limits.

Furthermore, a sensor such as a strain gauge, which combines sensing of tension and distance between two reference points of a single component of a cargo restraint, has a further advantage of being able to sense material strain. By analogue or digital means, a sensed quantity, figure, or value representing strain in a load binder or other component of a cargo restraint can be used in a computer, a programmable controller, or an analogue mechanical computer to compute mechanical stress in the load binder or other cargo restraint component. Since mechanical behavior of materials, especially deformation, rupture, and material failure after exceeding an endurance limit of cyclic loading can be characterized by testing or predicted by theories, formulae, and models known within practices of mechanical engineering and material science, a record of calculated tensile loads, deformations, stresses, strains, or some or all of these parameters may be compiled over the usage life of a load binder in service or over the course of an individual trip, journey, or shipment, or over an interval of time or a portion of any of these. The recorded information can be used by computer to generate trends or predict future behaviour of a load binder or other cargo restraint or a component thereof. The recorded parameter values or predicted future values can be compared against commonly acceptable material failure models of the material being sensed, and if a sufficient correlation is detected then a valuable inference about the likelihood of failure at a future time or within a span of future time can be made, and this prediction can be used to schedule or to suggest inspection, timely maintenance, or replacement of the load binder, cargo restraint, or component thereof. Specifically, a prediction of impending or imminent failure can trigger a warning or alert sent to an autonomous control system or vehicle crew or a driver, and also trigger a suggestion message or an automated reduction of maximum operating speed of a vehicle or vessel motive power plant, or even shut-down of an engine or motor until the failure hazard is corrected.

It is noted that complete rupture of a material is only one of many failure modes which would be a criterion for signaling a hazard condition, warning, or message that failure is in process or imminent. Plastic deformation or permanent stretching of cargo restraints may also comprise detected or predicted material conditions which initiate such a warning signal or automated corrective actions.

Referring now to the figures, FIG. 1 shows an actuator that will be coupled to a load binder. The load binder shown has two end effectors [2a] and [2b] for attachment to a cargo restraint such as a chain, a wire rope, a strap or the like, and anchor point or to another cargo restraint attached to such an anchor point. In the embodiment shown the end effectors are chain hooks, but the scope of the invention includes other means for attachment such as chains, straps, rope, webbing, a pin, a clevis, a pin and clevis, a threaded rod, a bolt, a clamp, a buckle, a loop of wire rope, a hasp, and a strap. Other cargo restraints included within the scope of the invention are designed to attach to anchor points such as eyebolts, cleats, or bollards. End effectors as attachment means also include clamps, threaded fasteners, pin and clevis systems, hitch pin and ball end systems, and eye fittings used for wire rope ends.

A tension or displacement sensor [12] hereafter referred to as a sensor, is attached to and monitors the material or components residing between two attachment points [10a] and [10b.] The sensor is a transducer which converts a measured material state into a parameter or value which can be a digital signal or an analogue signal such as an electrical voltage, a pneumatic or hydraulic pressure or vacuum, or a tension or displacement of one or more physical control cables.

The sensor is connected to a control module [20.]Communication of a sensed state of the tension between points [10a] and [10b] can occur either in an embodiment whereby a signal is generated by the sensor and transmitted to the control module, or by an interrogation signal or command from the control module to the sensor which then returns a value.

With the control module configured to operate as a closed-loop control system comparing sensed values to a pre-programmed acceptable value or value range, the control module is attached to and can send a corrective signal to a tensioning means operatively connected to a load binder between end effectors. such as an actuator [1] coupled to the drive stud [3] of a load binder of the Mahaffey design referenced in this application. The Mahaffey design is a tensioning means which is a mechanical device comprising a driving gear coupled to the stud or an integral feature of it, which meshes to a driven gear on at least one threaded barrel, and also having threaded components threaded onto these barrels such that rotation of the barrel causes a change in operating length between the two end effectors of the invention. The driving and driven gears are housed within a gearbox [4.]

In addition to the control module sensing tension or load and automatically signaling an actuator to tighten a cargo restraint as conditions warrant, the control module can transmit signals or data to other components of a vehicle system or an autonomous vehicle control system. In particular, signals representing or correlated to tension states or stress or strain states of a load binder or cargo restraint or a component thereof can be the basis of an alert or alarm signal sent to an annunciator [21] which can be a buzzer or electrical or electronic noise maker, or a warning indicator lamp, or other attention-getting device. An annunciator can also be a software subroutine which changes a portion of a visual display such as a virtual dashboard or a heads-up display. An annunciator which is part of control software can also produce a warning sound sent to speakers or other sound-producing peripherals connected to the control module of the invention. The control module can also be software installed on a general purpose computer or on a computer system which performs other functions while managing or monitoring a vehicle or a vessel.

In an additional embodiment described previously, load or tension data or stress or strain data or any or all of these and more can be stored in a data or information storage and retrieval system [22.] The data storage component of the system can incorporate limits of allowable condition of load, tension, stress, or strain or any or all of these parameters. Also as mentioned previously, the information storage and retrieval system can compare sensed data or behaviour to date or models known to be correlated or indicative of future material failure or a probability such as a percent chance of failure within a specific future interval of time.

FIG. 2a shows a stylized representation of a general sensor [12] sensing displacement or strain of a material or component of a cargo restraint. This sensor is installed by affixing two leads at attachment points 10a and 10b. Tensile load or displacement, strain, or stretch of the material is indicated in this figure by the two opposed arrows [25] and [26] in the figure.

FIG. 2b shows a mechanical displacement sensor which is normally closed unless a predetermined extension or tension is achieved. This embodiment includes a spring [30] around a shaft which ends in a paten [31.] Attachment means [7a] and [7b] are attached to two points such as [10a] and [10b] (of FIG. 1.) on a cargo restraint or load binder, and as tension through the restraint increases [7a] and [7b] get pulled apart from each other. In this embodiment, such movement causes the paten to catch the free end of the spring. Sufficient compression of the spring causes a portion of its coil to touch a contact [14] which can be used to electrically signal that a desired minimum tension acceptable for transport has been achieved, or can also be designed to signal an overload condition. Another contact [16] will be closed in an undesirable slack condition, an uncoupled condition, or a compressed condition occurs. This sensor embodiment includes terminals [28] and [29] for electrical connection to the control module, electrical cable, or other circuits.

FIG. 2c shows another sensor embodiment which includes a spring. It is normally open when slack, but electrical conductivity occurs once the paten [31] touches contact [16] and when a portion of the spring touches contact [14.] This device can be used where an electrically conductive state assures that a minimum tension is achieved. Loss of tension can then be used to signal the control module to drive the actuator until these electrical components are again closed, indicating that a proper tension has been re-established.

FIG. 2d shows a sensor embodiment using a capacitive or static electric field to sense the distance between two patens or plates which act together as a parallel-plate capacitor [34.] As the distance between the plates changes due to strain of the material, such as strain of the sensor housing, the capacitance between terminals [28] and [29] changes. For alternating current passing through the terminals, the electrical impedance of the sensor will change in response to changes in tension or material strain. The capacitive device can also function as a rate-sensitive sensor. A Hall effect sensor also resides within the scope of the invention; rather than capacitor plates a magnet is connected to [28] and a coil is connected to [29] or vice versa, to create another embodiment of a rate-sensitive sensor.

FIG. 2e shows an embodiment similar to the capacitive sensor of FIG. 2d, but in this case a piezoelectric cell or material [35] is bonded between the patens. The tensile load passes through the body of the sensor or another tension component connecting end effectors [7a] and [7b,] and the linear strain of the sensor body or tension component also acts upon the piezoelectric cell or material. In this embodiment emissions of voltage or current will occur in response to rate of change of extension of the load binder or cargo restraint. As opposed to linear responses, rate-sensitive measures can be used to signal the severity of impact loads experienced by goods in transit, so they can be used as a component in warning systems directed to detect and warn drivers or vessel pilots of unwanted vibration or shocks. In partial summary, a sensor in accordance with the invention can be an electrically normally closed sensor, an electrically normally open sensor, a capacitive sensor, a piezoelectric sensor, or a strain gauge or the equivalent.

In this specification, vibration is understood to comprise a long series of frequent individual impulses or impacts. The driver or vessel pilot can then take actions to reduce these unwanted forces, such as slowing down, lowering tire pressure, or changing the mechanical stiffness of adjustable shock absorber systems, or selecting a different route avoiding the sources of mechanical turbulence.

FIG. 3 shows a portion of another embodiment in accordance with the invention. The control module sensor, data storage components and the annunciator are not shown in the figure. The control module is operationally connected to a motor [1.] The control module does not necessarily provide drive power to the motor, instead it acts as a modulator or 'valve' (similar to amplifier vacuum tubes being referred to as 'valves') that can supply variable quantities of energy or power to the motor for variable torque and direction of rotation of the shaft of the motor. Energy to power the motor is commonly the drawn electrical system of the vehicle or vessel and the specifics of the electrical system or other power source for the motor is outside the scope of the invention The motor has a shaft which is rotatable coupled to a drive stud [32] which has gear teeth. The load binder of this embodiment includes a tube [49] with first and second ends, said first and second ends each having a threaded aperture. The threads on the first end are threaded in an opposite hand to the threads on the second end. One will be a left-hand thread and the other will be a right-hand thread.

The tube also has a driven gear [53] coaxially mounted to the tube. In this figure a pin [40] can couple the driven gear to the tube. The drive stud and driven gear reside within a gearbox [47] closed with a cover plate [37] affixed to the gearbox with screws [38.] The gearbox includes a journal bearing [33] wherein the tube can rotate, and a stub shaft [41] about which the drive stud can rotate. The journal bearing in the figure is shown fully encompassing the tube, but in other embodiments it need only extend partway around the tube. When assembled with the gearbox, these two components maintain the gear teeth of the drive stud and the gear teeth of the driven gear in meshed engagement so that when the motor shaft rotates the drive stud, the tube is also caused to rotate.

The load binder also has two threaded eyebolts [45.] One eyebolt acts as a first draw rod having threads [51] threaded complementarily to be received within the threaded aperture of the first end of the tube, and the other eyebolt has opposite-handed threads [52] to act as a second draw rod, being threaded complementarily to be received within the threaded aperture of the second end of the tube.

Because the motor is connected to the drive stud, which is meshed with the driven gear, which is coupled to the tube, rotation of the motor will rotate the tube. Like a turnbuckle, the tube rotation will either draw the eyes together or extend them further apart. In this embodiment, the eyes of the eyebolts are connected to chain links [36] which are connected to end effectors [2a] and [2b.] As described previously, the end effectors can be of various designs even though in this figure they are chain hooks. Also, although only one link is shown between the eyebolt eye and the end effector, more links may be used to create a longer load binder. With this particular structure explained, it is seen that rotation of the motor shaft, on command of the control module, changes the operating length between the first and second end effectors of the load binder and thus commands from the control module can tighten or slacken a load binder automatically.

More generally in the invention, tensioning means operate between at least two end effectors (a first and a second end effector) of a load binder. The invention has an actuator coupled to operate the tensioning means, and a control module connected to receive signals from a sensor connected to the actuator.

Although one set of embodiments within the scope of the invention are open-loop tension monitoring systems, where tension of a load binder or cargo restraint is merely monitored and may or may not be recorded, and whereby sensed tensions outside of an acceptable range are signaled to an annunciator without any further action being taken or commanded, a preferred set of embodiments within the scope of the invention are closed-loop tension control systems, whereby sensed tensions outside of an acceptable range are signaled to a control module which can then commit the control module to operate the tensioning means to slacken or tighten the cargo restraint.

Although a minimum of one sensor is required in the tension control system, it is also practical and within the scope of the invention to include more than one sensor so that different material states or tension states can be monitored simultaneously, and it is also contemplated to deploy sensors at more than one location, among one or more load binders and cargo restraints, all so as to more accurately characterize the effect of tension in the material or elsewhere in the cargo restraint and to detect and warn of unsafe conditions, loss of proper restraint of a load, or impending failure of a material, a load binder, or a cargo restraint. It is also within the scope of the invention to contemplate multiple sensors of the same type in the same location acting as redundant units for enhanced system reliability. Typically at least three sensors are used redundantly so that two signaling substantially identical readings "out-vote" a third egregious reading which is ignored and used to indicate that inspection, replacement, recalibration, or other system maintenance is warranted.

While certain features and aspects have been described with respect to exemplary embodiments, one skilled in the art will recognize that numerous modifications are possible.

For example, although helical springs are described in several embodiments, other springy configurations of material can also enable the invention, such as a multiply-folded leaf or z-fold of a strip material. Pneumatic, pressurized piston and cylinder devices can also be used as springs, and can even be pressurized or bled of air or working gases in response to commands from a control module, so that the system spring rate can be modified or optimized to measure or control a tensile state of a cargo restraint or load binder.

Also, while the foregoing description is primarily directed to restraints of cargo, goods, packages or large machinery loaded and in transit in vehicles, vessels, or transport machinery, the invention offers serviceable value and utility for restraints used to secure stationary objects subject to wind loads, gusts blustery weather, or forces wrought by waves or flood waters in motion, to restrain stationary objects during seismic events, or to restrain stationary objects on floating platforms in motion.

Furthermore, while various methods and processes described herein may be described with respect to particular structural and/or functional components for ease of description, methods provided by various embodiments are not limited to any particular structural and/or functional architecture.

Hence, while various embodiments are described with or without certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:
1. A tension control system comprising:
   a load binder further comprising
      a tube with first and second ends, said first and second ends each having a threaded aperture,
      a first draw rod threaded complementarily to be received within said threaded aperture of said first end of said tube,
      a second draw rod threaded complementarily to be received within said threaded aperture of said second end of said tube,
      a driven gear comprising gear teeth, with said driven gear coaxially coupled to said tube,
      a drive stud further comprising gear teeth in meshed engagement with said gear teeth of said driven gear, and
      said tensioning means further comprising a motor having a shaft rotatably coupled to said drive stud, said motor also operationally connected to said control module,
      so that motor shaft rotation changes an operating length between said first and second end effectors,
      and at least a first end effector and a second end effector;
   a tensioning means operatively connected to said load binder between said end effectors;
   at least one sensor;
   an actuator operatively coupled to said tensioning means; and
   a control module operationally connected between said sensor and said actuator, wherein said sensor provides a signal to said control module based on a tension in said load binder, said control module operating said tensioning means.

2. The tension control system of claim 1, wherein at least one of said end effectors is selected from the set of end effectors consisting of
a hook, a pin, a clevis, a threaded rod, a bolt, a clamp, a buckle, a loop of wire rope, a hasp, an eye, a ball end, and a strap.

3. The tension control system of claim 1, further comprising an annunciator, said annunciator operatively connected to said control module.

4. The tension control system of claim 1, wherein said at least one sensor is a sensor selected from the set of tension sensors comprising:
an electrically normally closed sensor, an electrically normally open sensor, a capacitive sensor, a strain gauge, a piezoelectric sensor, and a rate-sensitive sensor.

5. The tension control system of claim 1, wherein said sensor is connected to an information storage and retrieval system.

6. The tension control system of claim 1, wherein said control module is connected to an annunciator.

7. The tension control system of claim 1, wherein said tensioning means changes an operating length between said first and second end effectors.

8. A tension monitoring system comprising:
a load binder having a distal end and a proximal end,
a first end effector affixed to said distal end,
a second end effector affixed to said proximal end,
a tension sensor,
a tube with first and second ends, said first and second ends each having a threaded aperture,
a first draw rod threaded complementarily to be received within said threaded aperture of said first end of said tube,
a second draw rod threaded complementarily to be received within said threaded aperture of said second end of said tube,
a driven gear comprising gear teeth, with said driven gear coaxially coupled to said tube,
a drive stud further comprising gear teeth in meshed engagement with said gear teeth of said driven gear,
and a tensioning device comprising a motor having a shaft rotatably coupled to said drive stud, said motor also operationally connected to said control module,
so that motor shaft rotation changes an operating length between said first and second end effectors,
and a control module connected between said tension sensor and said motor,
wherein a signal from said tension sensor is compared in said control module to a reference value, and a difference value is created.

9. The tension monitoring system of claim 8, wherein at least one of said end effectors is selected from the set of end effectors consisting of
a hook, a pin, a clevis, a threaded rod, a bolt, a clamp, a buckle, a loop of wire rope, a hasp, an eye, a ball end, and a strap.

10. The tension monitoring system of claim 8, wherein said control module is connected to an annunciator.

11. The tension monitoring system of claim 10, wherein a signal is sent to said annunciator if said difference value exceeds a predetermined value.

12. The tension monitoring system of claim 8, wherein at said least one sensor is a sensor selected from the set comprising:
an electrically normally closed sensor, an electrically normally open sensor, a capacitive sensor, a strain gauge, a piezoelectric sensor, and a rate-sensitive sensor.

13. The tension monitoring system of claim 8, further comprising an information storage and retrieval system.

14. The tension monitoring system of claim 8, wherein said tensioning device causes a change in operating length between the two end effectors of the invention.

* * * * *